Oct. 17, 1961  A. F. HENNIES, JR  3,004,685
DISPOSABLE PAN

Filed Aug. 1, 1960  3 Sheets-Sheet 1

INVENTOR.
AUGUST F. HENNIES, JR.
BY *William R. Price*
ATTORNEY

Oct. 17, 1961 A. F. HENNIES, JR 3,004,685
DISPOSABLE PAN
Filed Aug. 1, 1960 3 Sheets-Sheet 2

INVENTOR.
AUGUST F. HENNIES, JR.
BY William R. Price
ATTORNEY

Oct. 17, 1961 A. F. HENNIES, JR 3,004,685
DISPOSABLE PAN

Filed Aug. 1, 1960 3 Sheets-Sheet 3

INVENTOR.
AUGUST F. HENNIES, JR.
BY
*William R. Price*

ATTORNEY

United States Patent Office 3,004,685
Patented Oct. 17, 1961

3,004,685
DISPOSABLE PAN
August F. Hennies, Jr., Jeffersontown, Ky., assignor to Hennies Engineering Corporation, Jeffersontown, Ky., a corporation of Kentucky
Filed Aug. 1, 1960, Ser. No. 46,802
8 Claims. (Cl. 220—72)

The present invention relates to disposable cooking utensils. More particularly it relates to disposable foil trays or pans. The invention relates primarily to a pie plate of the type which is meant to be included along with a pie that is carried thereby during the piemaking process, and even to the ultimate transaction involving delivery of the pie in the pan to the customer.

For many years, the practice in the baking industry was to utilize a heavy metal pan which because of its weight and cost necessitated the removal of the finished pie from the pan. Accordingly, a technique of heavy crust manufacture was developed so that the pie could be removed from the heavy pan without breaking it. More recently, due to developments in the frozen food and baking industries, it has become the practice to use a metal foil plate which can be delivered to the ultimate purchaser. Thus, the pie, from the time it is formed in the pan is not removed from the pan until the purchaser is ready to partake of it. As a consequence, flakier and more tender crusts are produced. This also allows for re-warming and in case of frozen pies, the browning of the pie in the oven.

In view of this practice, it is desirable to utilize a foil pan fabricated of metal foil which is extremely thin. Thus, within the limits of practicability, the foil pans are formed of the thinnest possible aluminum foil, commensurate with sufficient strength and rigidity for use in the pie baking process. This process includes, among other things: suspension of the pan by its rim flange onto parallel bars or wires. At this time the pan is filled, and if it is not sufficiently rigid, it will collapse, spilling the raw filling over the operational area, and generally disrupting operations.

It is an object of this invention, therefore, to provide a pan fabricated of a very thin foil material in the range of from .002 to .005 inch which has sufficient strength and rigidity for the pie making operation.

A further object of this invention is to provide a pan having a central depressed base; a wall sloping upwardly therefrom; and an annular rim flange having sufficient rigidity to stand up under various baking procedures.

Other further and important objects will become apparent to those skilled in the art from the detailed description thereof which follows.

I have discovered that in the manufactuer of an aluminum foil pan, by means of a metal stamping press, that the rigidity and strength of the resulting pan wil be increased considerably, if the annular rim flange is depressed from 5 to 25 degrees, prior to the bead forming operation. I have discovered further, that the strength and rigidity of the pan may be increased by the provision of a groove running circumferentially around the wall of the pan in the upper half of said wall.

As is well known, pans formed by pressure folding techniques are characterized by a series of vertical wrinkles or striations running around the wall portion of the pan. These striations running vertically along the wall portion of the pan, tend to give strength and rigidity to that wall. The provision of the annular groove or ridge in the wall in the upper one half thereof, separates said vertical striations and forms, in effect, a group of large striations in the lower portion of the wall and a group of small striations in the upper portion of the wall. The placement of said ridge or groove in the upper portion of said wall affects the number or size of the striations in the lower and upper wall portions. In a preferred form, the ridge is one-third of the way from the top of the wall. In this instance the number of striations in the upper wall portion in relation to the number in the lower wall portion is in a rough ratio of about 2:1.

The invention will be better understood by reference to the attached drawings. In the drawings identical reference numerals are utilized for identical parts throughout.

Referring now to the drawings.

Figure 2:
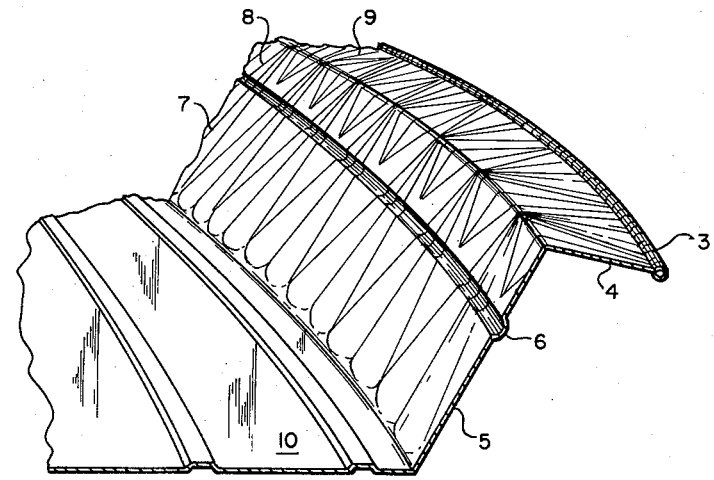
FIG. 2 is an enlarged fragmentary section, taken along line 2—2 of FIG. 1.

In the drawings the pan of this invention consists of a base or bottom 10, a wall 5, a rim flange 4, and a bead 3. The rim flange 4 tapers downwardly at an angle of from about 5 to 25 degrees from a hypothetical horizontal plane running parallel to the base 10. A special feature of this pan is a ridge 6, located in the upper third of the pan wall 5. Formation of this ridge changes the ratio of reinforcing striations 7, 8 and 9, which are inherently formed in the folding process. Thus, the ratio of the number of striations 8, in the upper portion of the wall in relation to the number of striations 7 in the lower portion of the wall 5, is roughtly 2:1. The striations 9 on rim 4 in relation to the number of striations 7 in the lower portion of the wall 5 is in the rough ratio of between about 2.5 to 1 and 3.5 to 1. The ratio of striations 7 in the bottom portion of wall 5 in relation to striations 8 in the top portion of said wall is in the range of about 1 to 1.7 and 1 to 2.3. The overall relationship between the distribuation of striations 7, 8, and 9 is in the range of about 1 to 1.7 to 2.5 at the lower limit and 1 to 2.3 to 3.5 at the upper limit. This distribution of the striations is best illustrated in FIG. 2.

Figure 1:
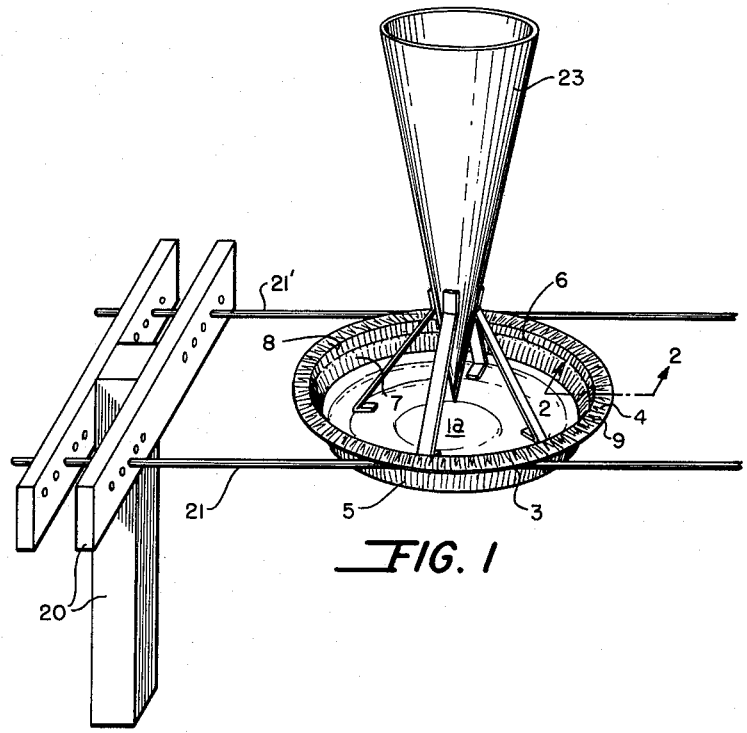
FIG. 1 is a view in perspective of a pan, embodying the features of this invention and illustrating a device for testing the strength of the pan.

FIG. 1 illustrates the pan itself, as well as the apparatus for testing its strength. This apparatus consists of rod support 20, two ⅛ inch square steel springs 21, running parallel to each other on which the rim flange 4, of the pan is supported. A conical container 23, is placed in the pan, and lead shot is added thereto until the rim flange 4 fails, the pan folds. This test procedure will be more fully developed later on.

Figure 3:
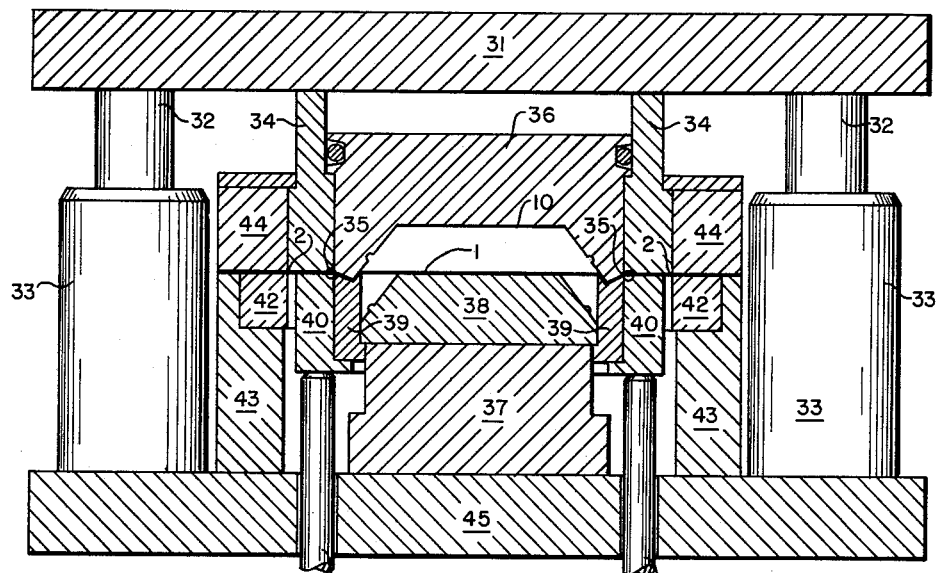
FIG. 3 is a front elevational section of a metal stamp press, illustrating the die and punch assembly at the cutting point on the downward stroke.

FIG. 3 illustrates the die punch assembly of a conventional stamping press. In the drawing the punch holder is designated by numerals 32 and 33. The blanking punch ring is designated by numeral 34 while the curling groove of said ring is marked by numeral 35. The adapter is designated by numeral 36, and the punch riser is designated by numeral 37. Draw punch 38, and inner draw ring 39, are surrounded by outer draw ring 40, controlled by draw pins 41. The blanking die ring 42, and the die ring riser 43, as well as the stripper ring 44, are all supported on the die holder 45.

In FIG. 3, the blanking punch ring is on its downward stroke and is illustrated at the cutting point 2 of aluminum foil blank 1.

Figure 4:
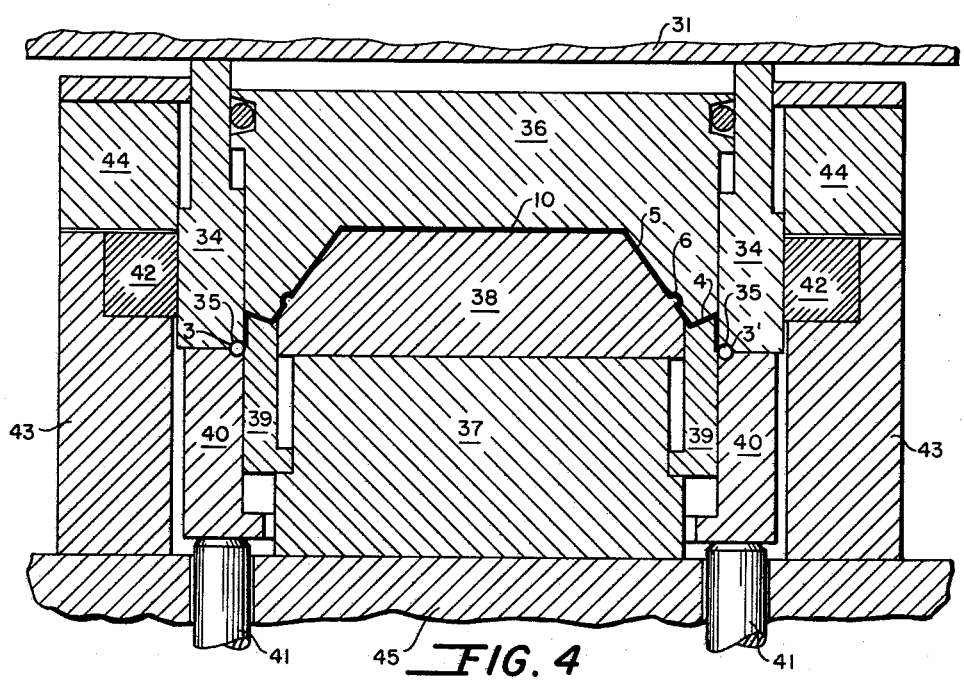
FIG. 4 is a front elevational section of a metal stamp press, illustrating the die at the bottom of the stroke.

In FIG. 4, the punch assembly is at the bottom of its stroke, having formed the base 10, wall 5, rim flange 4 and ridge 6 of the pan wall 5. The precursor of the bead is illustrated as 3′.

Figure 5:
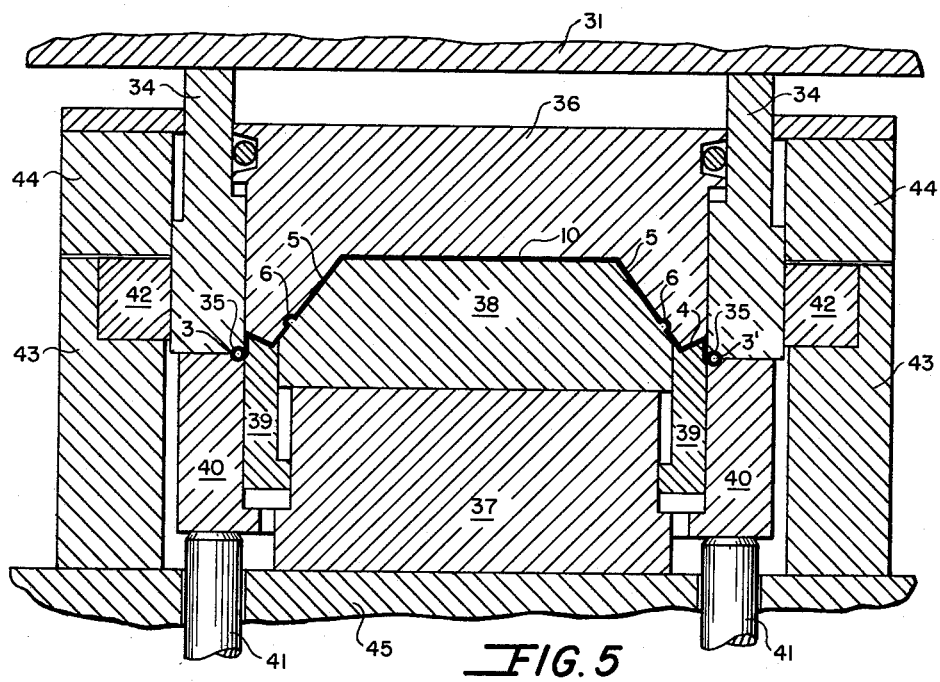
FIG. 5 is a front elevational section of a metal stamp press, illustrating the die and punch assembly on the up stroke.
Figure 6:
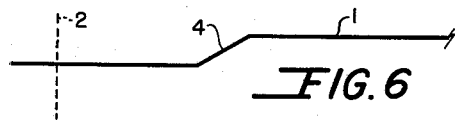
FIGS. 6–10 are schematic illustrations, which show the sequential steps in the formation of the pan.

FIG. 5 illustrates the formation of the bead 3 from the bead precursor 3′ on the upward stroke of the punch assembly. The bead precursor 3′ is engaged with curling groove 35 of the blanking punch ring 34.

Figure 7:
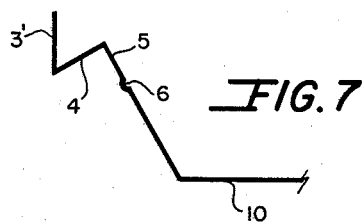
Figure 8:
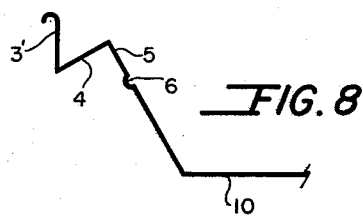
Figure 9:
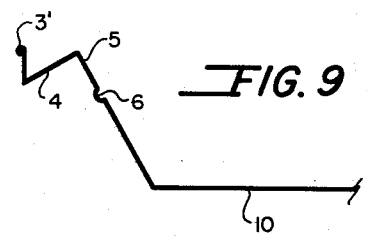
Figure 10:
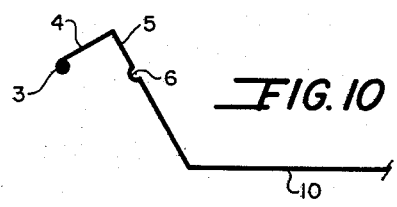

A schematic illustration of the sequential steps comprising the formation of the pan is illustrated in FIGS. 6–10. The aluminum foil blank 1, is shown at the cut off point 2, in FIG. 6. In FIG. 7, the wall 5, ridge 6, tapered rim 4 and base 10 have been formed as well as bead precursor 3′. This stage corresponds generally to that illustrated in FIG. 4. FIGS. 8, 9 and 10 illustrate the formation of the bead 3 from the bead precursor 3′ during the upstroke of the punch assembly. The bead is formed on the periphery of rim flange 4 which has already been tapered. In other words, the sequence of steps is formation of the pan comprising bottom 10, wall 5, ridge 6 and tapered rim flange 4, and thereafter forming the bead on the tapered rim. It will be appreciated that the striations 7, 8, and 9 are formed during the metal folding operations corresponding generally to the stage of formation illustrated in FIGS. 4 and 7. The ultimate strength and rigidity of the pan depends upon the interrelation of the striations to each other, and to the bead formed upon the rim flange. This relationship is effected by the location of the ridge 6 in the pan wall 5, and by the angle of the taper given to the rim flange 4.

*Example*

A series of pans were tested for holding strength. The test consisted of sequentially placing 14 pans of the same size, series and gauge thickness on the apparatus illustrated in FIG. 1. Thus, the rim flange 4 of each pan was placed on the two parallel ⅛ inch square metal rods 21. Conical container 23 was placed in the pan, and lead shot was added thereto until the rim flange failed and the pan folded or collapsed. The weight of the shot was recorded for each pan and an average collapse figure was established for each series of pans. The following tabulation indicates the superior holding strength of the pans of this invention over conventional pans. The conventional pans were identical in all respects to the pans marked improved, except that the conventional pans (identified as "OLD" in the table) had rim flanges extending horizontally in a plane parallel with that of the bottom of the pan. In addition, the "OLD" pans did not contain ridge 6. All tests were performed with 8″ round pans. However, tests with pans of considerable variation in diameter and shape indicate a proportionate increase in tensile strength in all cases.

| Series | 0.004″ Gauge Aluminum Foil | | | |
|---|---|---|---|---|
| | Old (wt. in oz.) | Imp. (wt. in oz.) | Imp. (in oz.) | Percent imp. |
| 800.2 | 82 | 120 | 38 | 46.3 |
| 800.3 | 51 | 84 | 33 | 64.7 |
| 800.4 | 57 | 86 | 29 | 50.8 |
| 800.5 | 80 | 115 | 35 | 43.7 |
| 800.8 | 61 | 88 | 27 | 44.2 |

| Series | 0.0035″ Gauge Aluminum Foil | | | |
|---|---|---|---|---|
| | Old (wt. in oz.) | Imp. (wt. in oz.) | Imp. (in oz.) | Percent imp. |
| 800.2 | 64 | 100 | 36 | 56.2 |
| 800.3 | 41 | 64 | 23 | 56.1 |
| 800.4 | 42 | 66 | 24 | 57.1 |
| 800.5 | 65 | 95 | 30 | 46.1 |
| 800.8 | 44 | 68 | 24 | 54.5 |

| Series | 0.003″ Gauge Aluminum Foil | | | |
|---|---|---|---|---|
| | Old (wt. in oz.) | Imp. (wt. in oz.) | Imp. (in oz.) | Percent imp. |
| 800.2 | 52 | 76 | 24 | 46.1 |
| 800.3 | 29 | 40 | 11 | 38.6 |
| 800.4 | 30 | 42 | 12 | 40.0 |
| 800.5 | 53 | 71 | 18 | 33.9 |
| 800.8 | 32 | 48 | 16 | 50.0 |

It will be noted that in each instance, the pans of this invention were considerably stronger than conventional pans. As indicated above, these pans have rim flanges, disposed at an angle in the range of from 5° to 25° from a horizontal plane parallel with that of their bases. My researches have shown that this is a somewhat critical range. If the angle is less than 5°, there is no appreciable improvement in strength over pans with rim flanges extending horizontally. At the other end of the range, I have found that it is essentially impossible to form a rim flange disposed at an angle greater than 25° from the horizontal plane. Accordingly, the taper of the rim flange will be within this range for optimum strength and ease of formation. Additionally, I have found that imposition of the ridge 6 in wall 5 of the pan increases its strength by about 5–10 percent. This ridge should be located in the upper portion of the wall, and preferably, at a line ⅔ of the way up from the bottom.

While the pan of this invention has been described as being formed through the use of punch press dies in pressure folding operations, it will be obvious to those skilled in the art that other equivalent methods may be practiced. Thus transfer dies or progressive dies may be utilized in forming a pan meeting the requirements of this invention. It is not intended that this invention be limited to the exact illustrative embodiment described herein but that it be interpreted to be commensurate in scope with the appended claims.

What is claimed is:

1. In a disposable foil pan made from a metal foil having a gauge thickness of from about .002 to about .005 inch, said pan comprising a base portion, an upwardly sloping wall, having vertical striations therein, a rim flange extending laterally therefrom, and disposed downwardly at an angle in the range of from 5 to 25 degrees from a horizontal plane and having striations in said rim, the combination with said wall and rim of a ridge imposed in the upper portion of said wall, which separates said wall into upper and lower wall portions and in which the vertical striations in the lower wall portions are lesser in number than the vertical striations in the upper wall portion and the striations in the rim are greater in number than the striations in either portion of the wall.

2. A disposable pan as defined in claim 1 in which the number of striations in the bottom portion of the wall in relation to the number of striations in the rim flange is in a ratio of about 1 to 2.5 and 1 to 3.5.

3. A disposable pan as defined in claim 1 in which the number of striations in the bottom portion of the wall in relation to the number of striations in the top portion of the wall and in relation to the number of striations in the rim flange is in a ratio of about 1 to 1.7 to 2.5 and 1 to 2.3 to 3.5.

4. In a disposable foil pan made from a metal foil having a gauge thickness of from about .002 to about .005 inch, said pan comprising a base portion, an upwardly sloping wall having vertical striations therein, a rim flange extending laterally therefrom and having striations therein; the combination with said wall of a ridge imposed in the upper half thereof which separates said wall into upper and lower wall portions, and in which the vertical striations in the lower wall portion are lesser in number than the vertical striations in the upper wall portion.

5. A disposable pan as defined in claim 4 in which the rim flange is tapered downwardly at an angle of about 5° to about 25° from a horizontal plane parallel to said base portion of said pan.

6. A disposable pan as defined in claim 4 in which the number of striations in the bottom portion of the wall in relation to the number of striations in the top portion of the wall are in a ratio of about 1 to 1.7 and 1 to 2.3.

7. In a method of producing a disposable foil pan having a base, wall and rim portion, in which a metal foil blank is formed into the shape of a pan by pressure between two dies and in which excess metal in the outer area of said blank is folded into a series of striations; the improvement in controlling the formation of striations in the wall and rim portion of said pan, which comprises the steps of imposing a ridge in the upper half of said wall portion and of disposing the rim flange downwardly at an angle in the range of from 5 to 25 degrees from a horizontal plane during the pressure forming operation.

8. In a method of producing a foil pan, having a base, wall and rim portion, in which a metal foil blank is pressure formed into the shape of a pan and in which excess metal in the outer area of said blank is folded into a series of metallic striations; the improvement in controlling the formation of striations in the upper wall portion of said pan, which comprises the steps of imposing a ridge in the upper half of said wall during the pressure forming operation.

References Cited in the file of this patent
UNITED STATES PATENTS

| | | |
|---|---|---|
| 2,629,534 | Reynolds | Feb. 24, 1953 |
| 2,656,066 | Riemenschneider | Oct. 20, 1953 |
| 2,899,922 | Wheeler | Aug. 18, 1959 |
| 2,924,369 | Richter | Feb. 9, 1960 |